Dec. 15, 1964 W. V. DE LUCA 3,161,718
VARIABLE POWER FLUID LENS

Filed July 12, 1961 3 Sheets-Sheet 1

INVENTOR
WALLACE V. DeLUCA

BY *Robert J. Dennison*
ATTORNEY

Dec. 15, 1964  W. V. DE LUCA  3,161,718
VARIABLE POWER FLUID LENS
Filed July 12, 1961  3 Sheets-Sheet 2

INVENTOR
WALLACE V. DeLUCA
BY
ATTORNEY

Dec. 15, 1964     W. V. DE LUCA     3,161,718

VARIABLE POWER FLUID LENS

Filed July 12, 1961     3 Sheets-Sheet 3

INVENTOR
WALLACE V. DeLUCA

BY *Robert E. Dennison*
ATTORNEY

United States Patent Office 3,161,718
Patented Dec. 15, 1964

3,161,718
VARIABLE POWER FLUID LENS
Wallace V. De Luca, Levittown, Pa., assignor of one-half to William Kurasch, Los Angeles, Calif., and one-half to United Research & Development Corp., a corporation of Pennsylvania
Filed July 12, 1961, Ser. No. 123,574
5 Claims. (Cl. 88—57)

This invention relates to new and useful improvements in variable lenses and more particularly to a fluid lens of the variable type whose optical properties can be continuously controlled and which can be employed in many types of optical equipment.

Man has for centuries been trying to develop a lens that will duplicate the human eye. So far he has been able to duplicate the eye in only one of the infinite number of functions of the human eye.

When objects are viewed at such close range that the eye, even if exerting its greatest effort, cannot focus sharp images of such objects upon its retina, or when objects are so remote in distance that their details are indistinguishable, instruments may be used to magnify the objects so that the eye may view them with maximum comfort and good resolution of detail. Such instruments employ lenses and or mirrors of appropriate design and have a variety of forms. The optical systems of such instruments are usually designed for a specific narrow field of use and if this range is to be extended, auxiliary optical components must be added. Hence, the normal camera optical system may be adapted by the addition of lenses for close-up, wide angle and telephoto use. Among the many types of optical instruments in use are magnifying glasses, microscopes, astronomical and terrestrial telescopes, transits and levels for surveying, binocular, field and opera glasses.

In the past, most of the above mentioned types of optical equipment employed solid glass lenses which could only be varied in use by changing the relative distances between lens components. Due to their fixed radius of curvature, these lenses could serve only limited purposes each, and to possess an optical system that could be used in all circumstances, required great expense due to the large number of auxiliary lenses and systems needed for such use.

Fluid lenses have in the past been suggested to overcome the inherent limitations of the solid glass lenses. These fluid lenses have never met with a great deal of success since their use has been limited to convex shaped lens surfaces due to their construction and since means to carefully control the tension on the lens envelope was not provided. This invention is believed to overcome the difficulties in fluid lenses heretofore present.

It is an object of the present invention to provide a variable lens of the fluid type which can be used in any type of optical device and whose optical properties can be readily changed at will.

Another important object of this invention is to provide a fluid lense wherein the tension of the elastic envelope enclosing the fluid can be directly controlled by means external to the lens fluid.

A still further object of this invention is to provide a variable fluid lens having two enclosed fluid portions which can be employed as a double convex lens, a double concave lens, or any combination of the two.

Another object of this invention is to provide a variable fluid lens whose properties can be accurately controlled in use by a close loop type computor.

A further important object of this invention is the provision of a fluid lens wherein the pressure of the lens fluid and the tension of the lens envelope is continuously and separately variable.

A still further object of this invention is the provision in a fluid lens of secondary fluid means in a closed system for controlling tension of the lens envelope.

Other objects of the invention are to provide a variable fluid lens, having the above objects in mind, which is of relatively simple construction, has a minimum number of parts, is inexpensive to manufacture, and is at all times efficient, reliable, and fully controllable in operation.

For other objects and for a better understanding of the invention, reference may be had to the following detailed description taken in conjunction with the accompanying drawings in which.

Figure 7A:
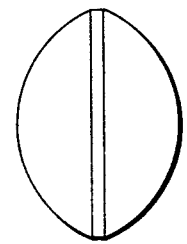
Figure 7B:
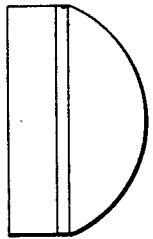
Figure 7C:
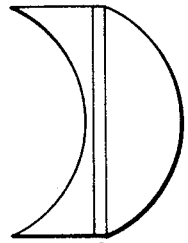
Figure 7D:
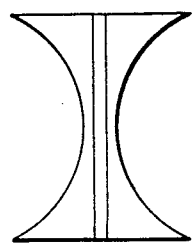
Figure 7E:
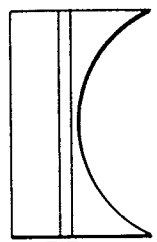
Figure 7F:
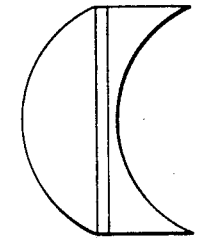
Figure 7G:
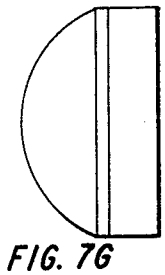
Figure 7H:
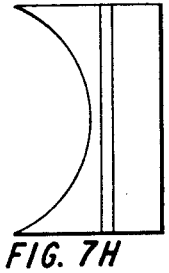
Figure 8:
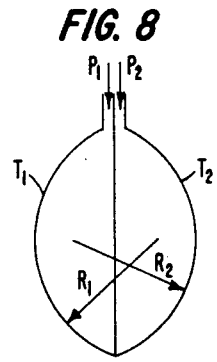
Figure 9:
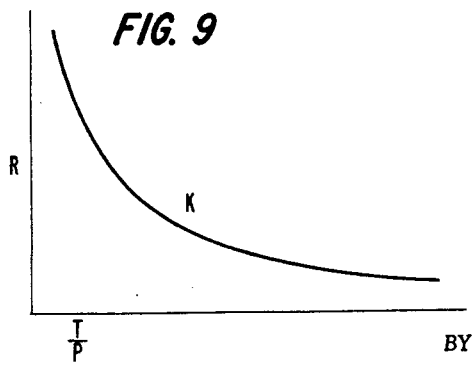

FIGURES 7A–7H show in schematic form the various lens combinations which may be formed with the present fluid lens and wherein FIGURE 7A represents a double convex lens;
FIGURE 7B represents a plano-convex lens;
FIGURE 7C represents a converging meniscus lens;
FIGURE 7D represents a double concave lens;
FIGURE 7E represents a plano-concave lens;
FIGURE 7F represents a diverging meniscus lens;
FIGURE 7G represents a convex lens; and
FIGURE 7H represents a concave lens;

FIGURE 8 is a schematic representation of a fluid lens with the variables indicated thereon; and FIGURE 9 is a graph of radius of curvature plotted against a ratio of tension with respect to pressure.

In order to more clearly understand the concept of the present invention, it will be of help to very briefly discuss the operation of the human eye. Light passes through the pupil into the main lens of the eye. This lens is a double convex shape similar to FIGURE 7A and not unlike the ordinary magnifying or reading glass. Unlike a glass lens, however, it is elastic and can change its focus.

The change in eye focus is controlled by an ingenious mechanism. All around the periphery of the lens is attached a membrane that contains many threadlike fibers. These fibers, like the spokes of a wheel radiate from the lens to a muscle which is shaped like a tire. This is called the muscle of accommodation or the ciliary muscle.

When this muscle is at rest it is widest open, and thus keeps a constant slight tension on the fibers attached to the lens, which tends to flatten the lens's surface or increase the radius of curvature. In this muscular condition, the lens of a normal eye brings to a sharp focus on the retina the images of objects that lie twenty feet or more away.

To bring nearer objects into focus, the ciliary muscle contracts and the circle that it forms becomes smaller. Thus, the pull on the edge of the lens decreases. Through its own elasticity, the lens draws together, and it sides curve out more. This, of course, shortens its focal length, and the images of the nearer objects come into sharp focus on the retina. When the ciliary muscle releases all tension on the lens, the normal eye of a child can bring into focus objects as close as two and one-half inches. With age, the elasticity of the lens decreases, and a fifty year old can normally focus on objects not closer than ten inches.

In the human eye, the space between the lens and the retina is filled with a clear jelly-like substance called the vitreous humor. The rays of light forming the image pass through this substance with little or no change.

With this understanding, reference is now made more specifically to the drawing, wherein like numerals designate similar parts throughout the several views and wherein the variable fluid lens constituting the subject matter of this invention is designated generally at 10.

The lens assembly of the invention comprises a two-piece lens block 11 made of two symmetrical halves 12 and 13. The lens block houses the optical members of the system and may be directly inserted in any type of optical equipment by fitting the same within a barrel or by any other conventional means of attachment. Lens block 11 is preferably manufactured from metal although plastic may also be utilized. It is anticipated that the block may be either cast, molded, or machined. Each block half is annular in shape with an enlarged center opening 14. The outside surface of each block half is carefully machined or molded to form a smooth curved annular face 15. Great care must be taken to insure that this curved surface is finely finished as it may affect the even tension on the lens diaphragms. The curved surface 15 extends slightly inwardly of the opening 14 to form the internal lens rim 16.

Near the outer periphery of the lens block halves where the curved face terminates, a plane annular diaphragm seat 17 is formed. It is against this seat that the lens diaphragm is to be clamped.

Figure 1:
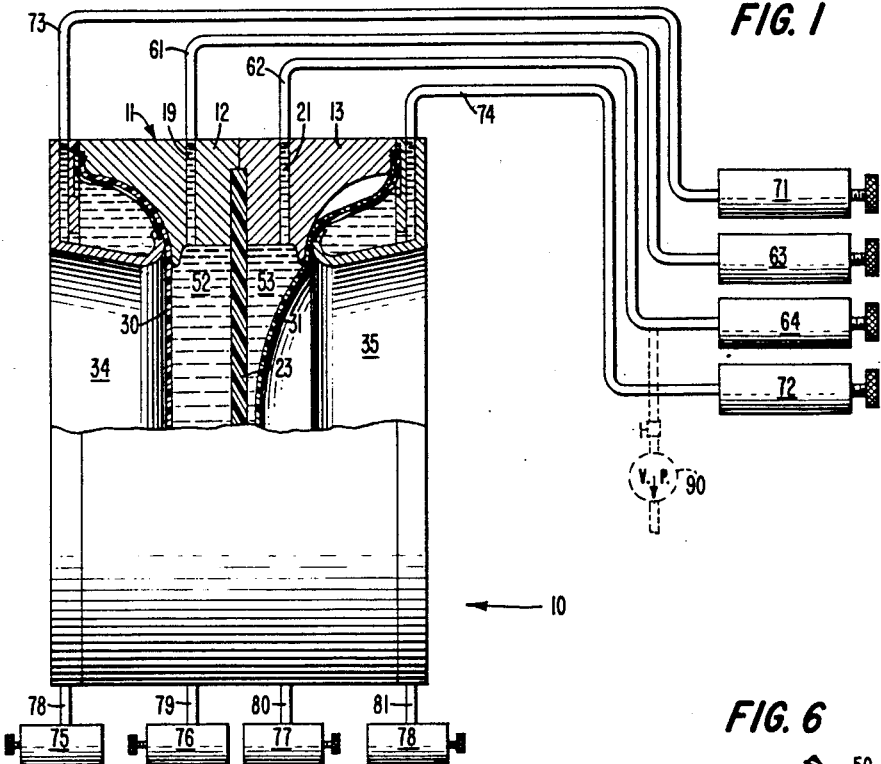
FIGURE 1 is a side elevation, partly in section, of my fluid lens system and all of its component parts.
Figure 4:
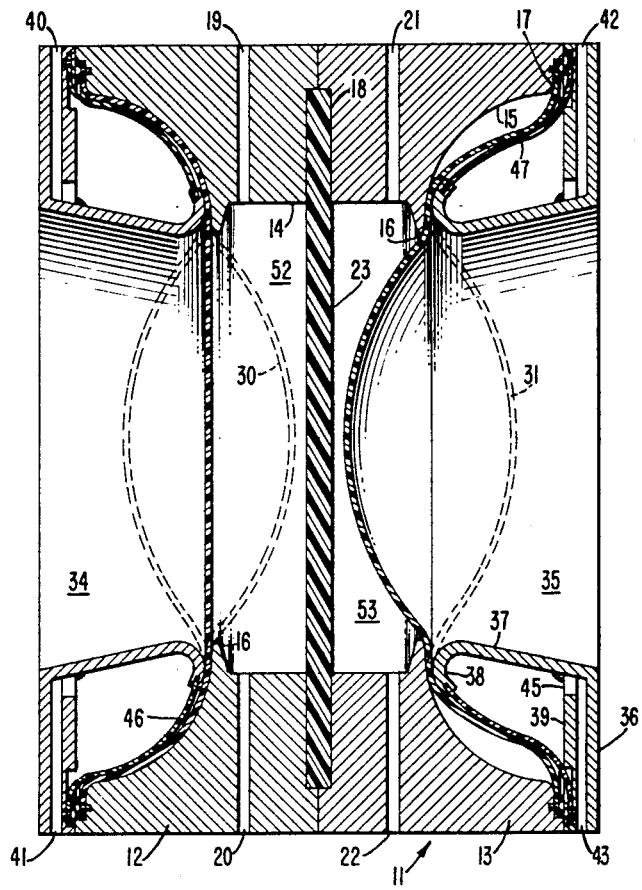
FIGURE 4 is a side elevation in section of the fluid lens showing the details of construction.

The inside face of each of the lens block halves are counterbored or cast as at 18 to provide a seat for the edges of the lens separator plate. As shown in FIGURES 1 and 4, each of the block halves has two conduits 19, 20, 21, and 22, respectively bored, cast, or otherwise formed therein in the position disclosed. These conduits will carry pressure fluid into and out of the lens chamber.

A separator disc 23 which serves to separate the lens chambers is inserted against the counterbored face 18 of one lens block half and the other half is then placed over the separator and the two halves connected together in any desired manner. The separator disc itself is preferably made of a relatively stiff plastic which is clear and has good optical properties. Actually, if desired, the separator disc can have a controlled flexation if the index of refraction thereof is the same as that of the other optical members in the system.

The lens diaphragms or films are indicated at 30 and 31 and are formed from round sheets of highly elastic sheet material which is transparent and perfectly clear. Preferably diaphragms 30 and 31 are a molded plastic which has good elastic properties and is highly flexible. Any of the vinyl resins may well be employed. Polyvinyl chloride, polyvinyl acetal and any mixtures of these may be used as well as many of the ester plastics.

If desired, a sufficient amount of any well known plasticizer may be added to the plastic to increase the plastic properties. The plastic used is generally molden in flat sheets of from .01 to .075 inch thick and the diaphragms then cut.

Figure 5:
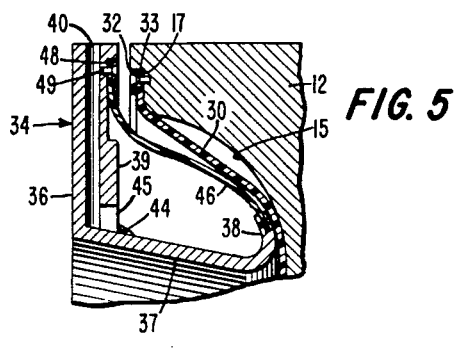
FIGURE 5 is a fragmentary sectional side elevation showing the tension controlling diaphragm and its operation.

The diaphragms 30 and 31 are assembled to lens block 11 by placing the peripheral edges of the diaphragms against the diaphragm seats 17 as shown in FIGURE 5. An annular diaphragm cover plate 32 is then placed over each diaphragm edge and is secured to the lens block by a number of screws 33.

Coaxial with the lens block and spaced slightly from the ends thereof are the tension control diaphragm retaining rings 34 and 35. Each of these rings is generally J-shaped in cross section with an upright outer wall 36 and an inwardly directed conical section 37 which terminates in a rounded hook 38. Spaced inwardly of and parallel with the outer wall 36 is an inner wall 39. This inner wall may be an extension of the outer wall bent over upon itself and sealed as by soldering to the conical section 37 as at 44. This construction provides a fluid receiving space between walls 36 and 39. Conduit receiving holes 40, 41, 42 and 43 are drilled in the periphery of the rings where walls 36 double back on themselves. At spaced positions about conical section 37, holes 45 are drilled into inner wall 39 adjacent the soldered seam.

Figure 6:
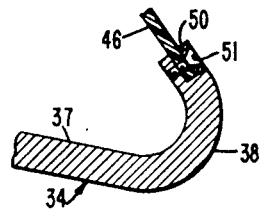
FIGURE 6 is a fragmentary sectional side elevation showing the connection between the tension controlling diaphragm and the diaphragm retaining ring.

Attached to and loosely spanning the gap between inner wall 39 and the tip of hook 38 is tension controlling diaphragm 46 (see FIGURE 5). A similar diaphragm 47 is attached to retainer ring 35. This diaphragm is annular in shape and preferably more elastic than the material employed for the lens diaphragm. Rubber or suitable plastic may be used. The outer end of the diaphragm is secured to the upper part of wall 39 by a retaining ring 48 and screw means 49. In a similar manner as clearly shown in FIGURE 6, the inner end of diaphragm 46 is secured to the tip of hook 38. Hook 38 is cut away at its tip to receive the end of the diaphragm and an annular plastic retaining ring 50 is placed against the diaphragm and is secured to the hook by a number of circumferentially spaced screws 51.

The assembled control diaphragm retaining rings 34 and 35 may be attached to the lens block assembly in any desired manner. This completed assembly may then be inserted in an instrument barrel or other optical device.

As previously noted, the lens diaphragms 30, 31 and the separator disc 23 provide two fluid tight lens compartments 52 and 53 within the lens block. These compartments are adapted to contain a suitable fluid supplied thereto through conduits 19 and 21 respectively.

Gases as well as liquids are comprehended for use as fluids. Generally, however, a liquid is to be preferred since its volume will not be affected by small temperature changes to the same extent as a gas. Fluid selection is limited by certain factors. Firstly, if low temperatures are to be encountered a liquid must be chosen which will not freeze. Secondly, the liquid must be transparent and preferably clear and colorless, although colored fluid might be used as a filter, etc. Thirdly, the fluid should be chemically inert and not harmful to the materials used to make the lens block, separator disc and other components. Fourthly, and most important, the fluid chosen should have the same index of refraction as the separator disc and the lens diaphragm. Fluids such as glycerine, gelatin and others are contemplated. It is to be understood that where the word "fluid" is used herein, it is to include not only liquids and gases, but also jellies.

Connected to each of the conduits 19 and 21 by flexible fluid lines 61 and 62 are the piston-cylinder pressure actuators 63 and 64 respectively. Each lens compartment fluid line and actuator, it will be seen, forms a unitary closed fluid system.

Figure 2:
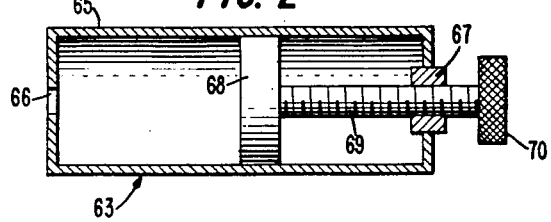
FIGURE 2 is a side elevation of the piston-cylinder pressure actuator with the casing thereof shown in section.

Since actuators 63 and 64 are identical in structure, only one will be described in detail. Referring to FIGURE 2, it will be seen that piston-cylinder actuator 63 comprises a cylindrical barrel 65 closed at each end but having a conduit receiving hole 66 bored in one end. The other end of the cylinder has an internally threaded bushing 67 fixed therein. A piston member 68 slidable within the cylinder is carried at the end of a rod 69 which is threaded into bushing 67. A knurled operating knob 70 is fitted on the outer end of rod 69. In use the respective fluid lines 61 and 62 are connected to base hole 66 of the actuators 63 and 64 and suitable fluid placed within the closed system.

Similar actuators 71 and 72 are provided for each of the tension control diaphragms 46 and 47. These actuators are connected to conduit receiving holes 40 and 42 by fluid lines 73 and 74 respectively. Each tension control diaphragm, retaining ring, fluid lines, and actuator forms a separate closed fluid system.

Figure 3:
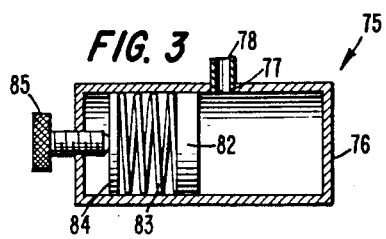
FIGURE 3 is a side elevation of the compensator used with the fluid lens with the casing thereof shown in section.

Operatively connected with each of the above described closed fluid systems is a dash-pot type of pressure compensator as at 75, 76, 77, 78 in FIGURE 1. These compensators are identical in construction and the details of compensator 75 are shown in FIGURE 3. Each compensator comprises a cylindrical case 76 closed at both ends but having an opening 77 in its side wall adapted for connection to one of fluid lines 78, 79, 80, or 81 which connect to bores 41, 20, 22, and 43 respectively in the lens assembly. Slidably mounted in case 76 is a compensator valve plate 82 which is normally urged to the right in FIGURE 3 by coil spring 83. In order to adjust the spring force on plate 82 an adjusting plate 84 abuts one end of the spring and may be moved by adjusting screw 85 which is threaded through one end wall of the casing. These compensators serve to subside any pressure surges and act to dampen out vibrations in the pressure fluid.

When normal fluid pressure is acting against the tension controlling diaphragm, it relaxes its pressure on the lens diaphragm which is then fairly loose and if pressure within chamber 53 is reduced below normal, a concave lens is shown in which lines on the right in FIGURE 4 will result. In this relaxed state, if pressure is increased in chamber 53, a concave lens will result as shown in the right in dotted lines in FIGURE 4. On the other hand, if pressure is increased against the tension controlling diaphragm, it will force the lens diaphragm up against curved surface 15 of the lens block stretching it and therefore placing it in tension. This will under normal pressure in the lens chamber cause the lens diaphragm to assume a flat position as shown in solid lines on the left in FIGURE 4.

The operation of the lens will be apparent from the foregoing. If the fluid system is filled with fluid in the manner described when the piston 68 is at its midway position, as shown in FIGURE 2, it will be appreciated that moving the piston to the left as by screw 69 will force fluid out of the actuator through fluid line 61 into compartment or chamber 52. This will increase the volume of fluid and also the pressure within the chamber. In that the separator disc 23 is of relatively rigid material, the increase in pressure will have no material effect upon it. But, since diaphragm 30 is highly elastic, the force created by the pressure increase will deform the diaphragm from its position at normal pressure to some position such as that shown by dotted lines to the left in FIGURE 4. Continuing to move the piston to the left will further increase the pressure and the volume of the fluid within the chamber and will move the diaphragm to an even more deformed position than that shown.

Movement of the piston to the right past the position shown in FIGURE 2 will obviously withdraw fluid from chamber 52 to reduce the volume contained therein and will, therefore, also lower the internal pressure of the fluid in the chamber. The diaphragm under these described conditions and at normal temperatures will have a concave shape as at the full line position on the right in FIGURE 4. Further movement of the piston to the right, beyond that already noted, causes the withdrawal of more fluid from the chamber within the lens block and the creation of a negative pressure therein. With the use of certain gases as a pressure fluid, it may be necessary to include a vacuum pump as shown in dotted lines at 90 in FIGURE 1 to aid in achieving such negative pressure.

It can thus be readily seen that by controlling the tension on lens diaphragms 30 and 31 by means of actuators 71 and 72 and by controlling the pressure of the fluid within the chambers 52 and 53 a large number of varied lens combinations can be achieved as shown in FIGURE 7. It is further contemplated that several such lens systems could be stacked up in series for even more variance.

Since each specific lens shape depends upon actuation of at least two piston-cylinder actuators, it may be advantageous to connect any two actuators together for co-joint operation by a single manual means at a distance such as stepping solenoids, servos, or selsyns.

With this lens system I can produce an infinite number of different lens diaphragm radius of curvatures by controlling the tension of the film with respect to the pressure of inflation. Referring to FIGURE 8, the tension of one film is represented as $T_1$, while the tension of the other is indicated as $T_2$. Similarly $P_1$ is the inlet fluid pressure on one side of the separator disc and $P_2$ is the inlet pressure of the fluid on the other side.

A plano-convex lens can be produced if $T_1$ is reduced and $T_2$ increased. By varying the tension the lens thickness is, of course, varied and the power as well. Thus, by controlling the tension and regulating the pressure, an infinite number of lenses of infinite radius of curvature can be produced, and this in turn is an infinite series of lenses of various powers of magnification.

The relationship between tension of the diaphragm $T_1$, pressure of the fluid $P_1$, and $R_1$, the radius of curvature can be found by the following expression from the curve shown in FIGURE 9. Radius of curvature plotted against a ratio of tension with respect to pressure will produce curve K. To produce a lens of a definite radius of curvature, a constant K as found above times the ratio of tension with pressure and will produce a definite magnification of power for a single lens system. I further realize that by the above method and the following formulas, that a family of curves can be produced with accuracy when repetition of tension being the same for the said condition and pressure being the same for the above condition. As can be seen, it would be simple to produce any type of lens required by the application of a computor (servo system) close loop type for controlling the amount of required tension and pressure. This can also be carried out with a digital or antilog computer.

If I let:

T=tension of the diaphragm
P=pressure of the fluid
and

R=radius of curvature, the following formulas relating to FIGURES 8 and 9 can be developed:

$$R_1 = \frac{K_1 T_1}{P_1}$$

$$\frac{R_1 P_1}{T_1} = K_1$$

$$\frac{R_1 P_1}{T_1} = \frac{R_2 P_2}{T_2}$$

$$R_1 P_1 T_2 = R_2 P_2 T_1$$

$$\frac{T_2}{T_1} = \frac{R_2 P_2}{R_1 P_1}$$

$$\frac{R_2}{R_1} = \frac{P_1 T_2}{P_2 T_1}$$

$$R_2 = \frac{K_2 T_2}{P_2}$$

$$\frac{R_2 P_2}{T_2} = K_2$$

$$\frac{P_1}{P_2} = \frac{R_2 T_1}{R_1 T_2}$$

$$T_2 = \frac{R_2 P_2 T_1}{R_1 P_1}$$

$$T_1 = \frac{R_1 P_1 T_2}{R_2 P_2}$$

$$R_2 = \frac{P_1 T_2 R_1}{T_1 P_2}$$

$$R_1 = \frac{P_2 T_1 R_2}{P_1 T_2}$$

$$P_1 = \frac{R_2 T_1 P_2}{R_1 T_2}$$

and $$P_2 = \frac{P_1 R_1 T_2}{R_2 T_1}$$

Where $p$ = object distance from lens;
$q$ = image distance from lens;
$f$ = focal length of the lens; and
$\mu$ = index of refraction;

$$\frac{1}{f} = \frac{1}{q} + \frac{1}{p}$$

$$\frac{1}{f} = (\mu - 1)\left(\frac{1}{R_1} + \frac{1}{R_2}\right)$$

$$(\mu - 1)\left(\frac{R_1 + R_2}{R_1 R_2}\right) = \frac{P + q}{Pq}$$

$$\frac{R_1 + R_2}{R_1 R_2} = \frac{1}{(\mu - 1)}\left[\frac{P + q}{Pq}\right]$$

$$\frac{1}{R_1} + \frac{1}{R_2} = \frac{1}{(\mu - 1)}\left[\frac{1}{q} + \frac{1}{P}\right]$$

$$\frac{P_1}{K_1 T_1} + \frac{P_2}{K_2 T_2} = \frac{1}{(\mu - 1)}\left[\frac{1}{q} + \frac{1}{P}\right]$$

This last expression is the general equation for the variable lens system and as can be seen is a simple computer equation. By use of an appropriate computer programmed for this equation and connected through servos to the various piston-cylinder actuators 63, 64, 71 and 72, any of the lens combinations shown in FIGURE 7 can be automatically produced.

While I have shown and described a preferred embodiment of the invention, it is to be understood that the drawings and detailed disclosure are to be construed in an illustrative rather than a limiting sense since various modifications and substitutions of equivalents may be made by those skilled in the art within the spirit and scope of the invention as defined in the appended claims.

What I claim as new and desire to protect by Letters Patent of the United States is:

1. A variable fluid lens comprising in combination; a lens block having an axial opening therethrough, a flexible and resilient transparent lens diaphragm spanning one end of said opening, transparent means axially spaced from said lens diaphragm and spanning said opening, said diaphragm and transparent means defining a fluid chamber therebetween, a pressure fluid within said chamber, an annular tension controlling diaphragm, means retaining said tension controlling diaphragm in proximity to the peripheral edge portion of said lens diaphragm, fluid pressure means for variably expanding said tension controlling diaphragm against the peripheral portion of said lens diaphragm, whereby tension of the lens diaphragm may be varied.

2. A variable fluid lens comprising in combination; a lens block having an axial opening therethrough, a flexible and resilient transparent lens diaphragm spanning one end of said opening, transparent means axially spaced from said lens diaphragm and spanning said opening, said diaphragm and transparent means defining a fluid chamber therebetween, a pressure fluid within said chamber, actuator means for varying the pressure of the fluid within said chamber, an annular tension controlling diaphragm, means retaining said tension controlling diaphragm in proximity to the peripheral edge portion of said lens diaphragm, fluid pressure means for variably expanding said tension controlling diaphragm against the peripheral portion of said lens diaphragm, whereby tension of the lens diaphragm may be varied.

3. A variable fluid lens as defined in claim 1, wherein the lens diaphragm, the transparent means, and the pressure fluid have the same index of refraction.

4. A variable fluid lens comprising in combination; a lens block having an axial opening therethrough, a first flexible, transparent and resilient lens diaphragm spanning one end of said opening, a second flexible, transparent and resilient lens diaphragm spanning the other end of said opening, a transparent separator disc spanning said opening and spaced axially inwardly of each of said lens diaphragms, said diaphragms and separator disc defining two separate fluid chambers, pressure fluid within each of said fluid chambers, first and second annular tension controlling diaphragms, means retaining each of said tension controlling diaphragms in proximity to the peripheral edge portion of the first and second lens diaphragms respectively, fluid presure means for variably expanding each of said tension controlling diaphragms against the peripheral portions of said lens diaphragms, whereby the tension of the lens diaphragms may be varied.

5. A variable fluid lens comprising in combination; a lens block having an axial opening therethrough, a first flexible, transparent, and resilient lens diaphragm spanning one end of said opening, a second flexible transparent and resilient lens diaphragm spanning the other end of said opening, a transparent separator disc spanning said opening and spaced axially inwardly of each of said lens diaphragms, said diaphragms and separator discs defining two separate fluid chambers, pressure fluid within each of said chambers, first and second actuator means for varying the presure of the fluid within each of said chambers, first and second annular tension controlling diaphragms, means retaining each of said tension controlling diaphragms in proximity to the peripheral edge portions of the first and second lens diaphragms respectively, fluid pressure means for variably expanding each of said tension controlling diaphragms against the peripheral portions of said lens diaphragms, whereby the tension of the lens diaphragms may be varied.

References Cited by the Examiner
UNITED STATES PATENTS

| | | | |
|---|---|---|---|
| 509,379 | 11/93 | Ingram | 88—57 |
| 2,300,251 | 10/42 | Flint | 88—57 |
| 2,836,101 | 5/58 | De Swart | 88—57 |

JEWELL H. PEDERSEN, *Primary Examiner.*

EMIL G. ANDERSON, *Examiner.*